Nov. 28, 1967  D. R. VAUGHAN  3,354,660
CABLE LAYER
Filed May 6, 1965  2 Sheets-Sheet 1
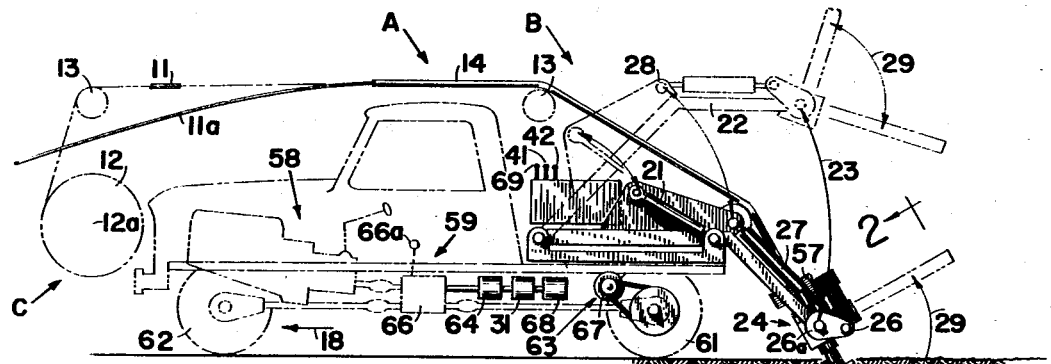
Fig 1.
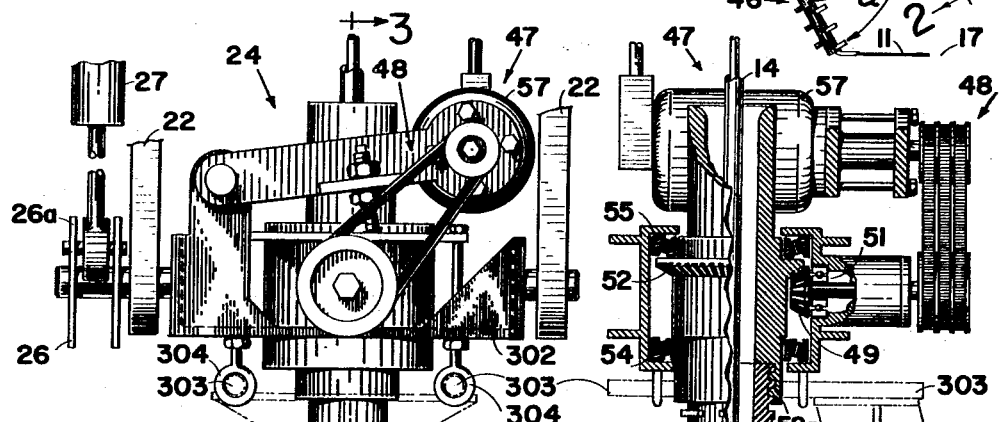
Fig 2.
Fig 3.
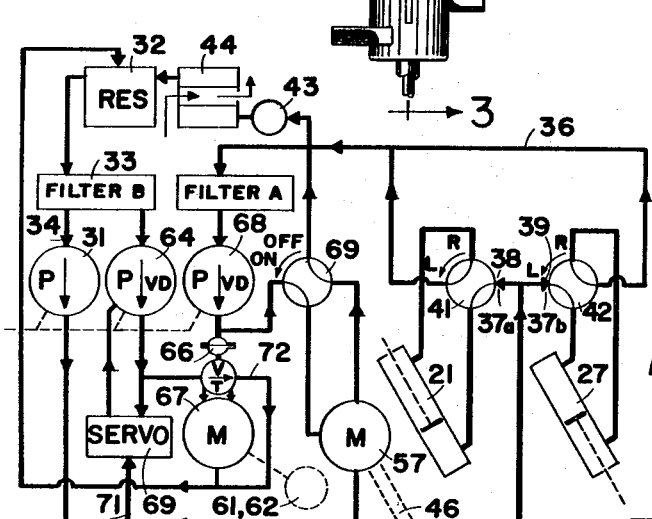
Fig 4.
DONALD R. VAUGHAN
INVENTOR.
BY
Townsend and Townsend

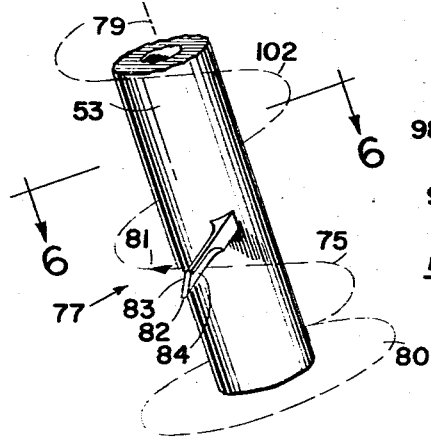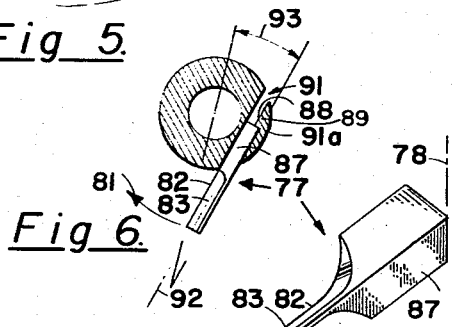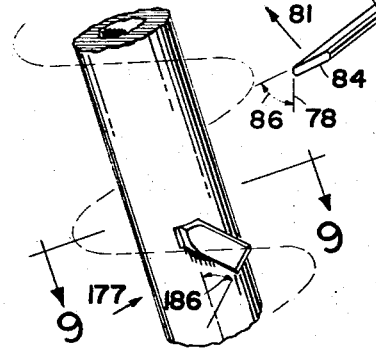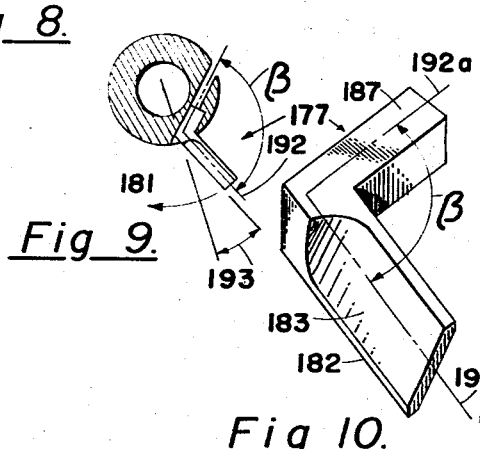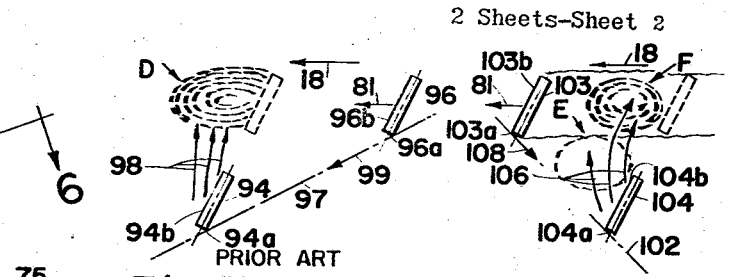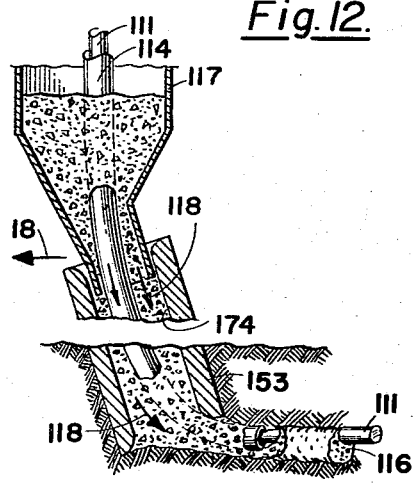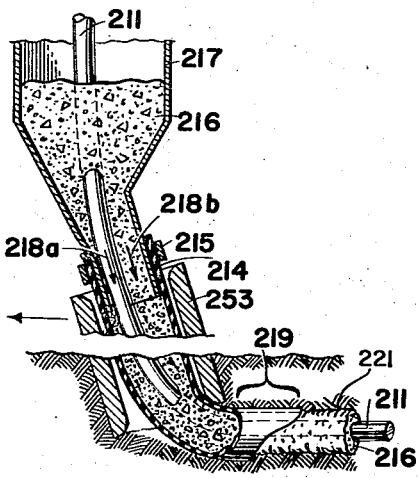

United States Patent Office 3,354,660
Patented Nov. 28, 1967

3,354,660
CABLE LAYER
Donald R. Vaughan, Woodland, Calif., assignor to Woodland Manufacturing Company, a corporation
Filed May 6, 1965, Ser. No. 453,677
13 Claims. (Cl. 61—72.2)

ABSTRACT OF THE DISCLOSURE

Cable laying apparatus having a rotatable earth-cutting tool provided with spaced teeth arranged to avoid displacement of earth into the paths of travel of succeeding teeth. Means is provided to rotate the tool and to feed a cable and grouting material therethrough, as the tool advances through the earth and rotates in a predetermined direction.

---

This invention relates to a cable layer of the type which places a cable, conduit, or the like, beneath the earth's surface without creating a trench or slit and more particularly to improvements in the earth agitating tool arrangement of such a device.

In the past, most cable trenching machines have been of a type which dig a trench, place the cable therein, and then backfill the trench or slit. Such devices are exemplified by the U.S. patents to McKinnon, No. 2,417,313; Bacon, No. 2,373,652; Kinsinger, No. 2,692,092; and Engle et al., No. 2,360,334. With increasing demands in recent years for submerged utility cables, leaching lines, and the like, there has arisen a need for apparatus that can place such conduits without the extra cost, inconvenience, and time required by earth removal and backfill.

Some attempts have been made to provide such a non-trenching device, for example, as shown in the U.S. patent to Adams, No. 1,337,184; but as this patent shows in its principal embodiment, best seen in FIG. 3 of that patent, the type of earth agitation relied upon is in the form of a serrated helix which essentially is an earth removal device. When attempts are made to use this type of structure for non-trenching cable laying, which requires that the helix move transversely through the earth in a direction normal to the helix's longitudinal axis, the flight of the helix abuts directly against the earth to be moved and requires relatively high power to cut through the earth along its extensive line of contact with the helix. Even if cutting action is commenced, the helical flight tends to become clogged, particularly where the earth is of a damp or adhesive consistency, e.g., clay, adobe, or the like. In addition, as shown by Adams, with the helix rotating in the direction indicated in FIG. 5 of that patent, the earth tends to be removed, thus forming a trench, rather than merely being displaced about the helix to allow the cable laying tool to advance and deposit the cable in a subterranean position. Thus, this type of prior art device does not achieve the more efficient procedure of displacing or agitating the earth about the tool cylinder, which moves transversely through the ground in a direction normal to the cylinder's longitudinal axis, whereby the cable may be laid thereunder in a manner affording a relatively rapid cable laying operation with reasonably modest power consumption while avoiding additional steps of backfilling.

Another problem with prior art devices such as Adams' is that the resistance to the forward motion of the helical cutter through the ground may become so great that ordinary tractive drives may be unable to advance the cable laying vehicle and deposit the cable thereunder.

The more recent British patent to Schneider, No. 689,754, is also directed to apparatus for non-trenching laying of subterraneous cable without removal of earth and shows a series of knife-like cutting tools arranged in a helical pattern along a rotating cylinder. Schneider's helical pattern is conventional in that the direction of rotation of the agitator in respect to a fixed point in the earth is such that the cutting edge of a first advancing tool is in a plane below the cutting edge of the cutting tool directly behind the first and in the same helical path. With this type of tool path arrangement, the earth being displaced from one tool face is deflected or compressed upwardly into the path of the next advancing tool which protrudes from the agitator surface. Although such an arrangement of the tool bits tends to raise the earth in a continuing upward motion, as is desirable in the case of trenching or earth removal, this type of tool arrangement and earth moving action has serious disadvantages for the achievement of non-trenching cable laying. Foremost among such disadvantages is the fact that the flow of earth as just described tends to cause a buildup of material along all of the cutting faces of the tools or agitator teeth and clogs the working space between adjacent teeth with earth in a relatively short time. Such clogging or filling of the working space between teeth destroys the clearance that the tools must have in order to cut into the earth and continue the cable laying operation. Moreover, even if the entire working space between teeth is not filled, partial earth clogging causes reduction of the cutting efficiency of the device which then requires relatively large amounts of power to continue even at a relatively slow rate of cable laying operation. In certain types of soil, such a tool arrangement becomes wholly inoperative due to the relatively rapid and complete buildup of earth on and between the cutting faces and back surfaces of the teeth. Such inoperativeness also tends to occur where the soil is rocky and large particles or rocks are thrust by one cutting tool directly into the path of the next advancing tool. The accumulation of rocks and other particulate matter in and around the tool cutting surfaces also creates increased frictional drag between the agitator and surrounding earth, thus requiring additional power for rotation without adding to the effectiveness of the cable laying operation.

Another problem common in cable laying operations is the encountering of roots of plants and trees at depths which many cable and conduit are laid. Using the various tool shapes of the prior art with which I am familiar, such root structures tend to become clogged or jammed between the tool bit and the tool holding cylinder or agitator. Consequently, the cable layer tends to stall or, at best, proceeds with some portions of the agitator rendered partially or wholly inoperative. If cable laying can be continued at all under such conditions, it is generally at reduced speed and requires relatively large amounts of additional tractive and cutting power.

In some instances, cable laying operations may encounter a combination of the above described problems of damp or clay like soils, rocky strata and/or root obstructions. None of the known devices with which I am familiar provides an effective solution to non-trenching cable laying under such conditions.

Thus an object of this invention is to provide a cable laying device for non-trenching placement of cable beneath the earth's surface of the type having an elongate, tubular, tool holding member adapted to be moved transversely through the earth with its longitudinal axis substantially vertical. Means are provided in the center of the tool holding member to carry cable to the bottom portion thereof and further means are provided to rotate the tool holding member in a predetermined direction while simultaneously moving the member transversely through the earth's surface. A plurality of teeth are mounted on and project from the surface of the tool holding member, and each tooth forms an upper and lower surface disposed at n angle to force earth in a first direction during rotation of the member. The teeth are arranged with respect to each other so that each succeeding tooth, with reference to the direction of rotation of the tool holding member, is in a position away from the direction of displacement of earth by the preceding tooth.

A feature and an advantage of the above-described novel tool bit arrangement is that earth material being displaced by the tool holding member is prevented from building up on the cutting edges of successive tool bits thereby preventing the clogging or jamming of the tool holding member or earth agitator.

Another object of this invention is to provide a cable laying device utilizing a rotatable, hollow, tool holding member having a plurality of teeth mounted thereon and projecting therefrom. Each tool bit is provided with a positive rake angle surface which terminates in a lower cutting edge. The entire array of tool bits is so arranged that each bit is at a higher elevation than the next closest succeeding tool bit with reference to the rotation of the tool holding member.

Another object of this invention is to provide a creep drive for the vehicle transporting the entire cable laying device including pressure sensing means responsive to the degree of resistance imposed by the particular earth or ground to the earth agitator as it rotates and propels through the earth's crust. The sensing means includes a servo valve which controls the vehicle tractive or creep speed system so that as the cable laying device encounters difficult earth, clay, rock or the like, the vehicle tractive or creep speed is reduced.

A feature and an advantage of the creep drive system is that the cable laying operation may proceed through various types of ground without overstressing the cable laying head and the teeth of the several tool members secured to the earth agitator.

Another feature and advantage of the above creep drive system is that it tends to prevent loss of traction between the vehicle and the earth's surface which may occur if the vehicle is attempted to be moved at the same speed through difficult ground as through relatively soft earth.

Another object of this invention is to provide a novel tool bit which has a pronounced negative radial rake angle in combination with the novel tool bit arrangement on the tool holding member described above.

A feature and an advantage of the aforementioned structure is that roots or other obstructions which may be present in the region where the cable laying device is operating are not ensnared between individual tool bits and the tool holding member. Thus, the entire device may continue in operation without the added frictional drag which would occur if roots or other obstructions were caught between the tool bits and the tool holding member.

Another object of this invention is to provide a relatively simple stepped slot means for securing the several tool bits to the tool holding member or earth agitator.

A feature and an advantage of the aforementioned object is that various types of tool bits may be readily installed at various elevations along the tool holding member. In this way the more efficient positive radial rake angle tool bits may be employed in those strata of the earth's crust which are free of obstructions, while other types of tool bits, e.g., those having a negative radial rake angle, may be employed in those strata in which the aforesaid types of obstructions may be encountered.

Another object of this invention is to provide the hollow tool holding member with a hopper for holding grout or other suitable material which may be gravity fed through said member and disposed into the earth's crust with the cable, conduit or the like.

A feature and an advantage of this invention is that the cable laying device described herein may be utilized to lay conduit for leaching lines or the like with the necessary under-grout in a single non-trenching, conduit laying operation.

Another object of this invention is to provide a hopper for use in combination with the tool holding member and designed to feed grout or other suitable material into the flexible conveying means which guides the cable laid through the tool holding member. In this way, cable may be laid entirely surrounded by grout or other suitable material as it is placed in position under the earth's crust.

Other objects of the present invention will become apparent upon reading the following specification and referring to the accompanying drawings in which similar characters of reference represent corresponding parts in each of the several views.

Turning now to the drawings, FIG. 1 is a general side elevation showing my device mounted on a conventional four-wheel vehicle;

FIG. 2 is a view taken along line 2—2 of FIG. 1;

FIG. 3 is a view taken along line 3—3 of FIG. 2;

FIG. 4 is a schematic block diagram of the hydraulic circuit of my invention;

FIG. 5 is a fragmentary perspective view of one portion of my invention utilizing one type of tool member;

FIG. 6 is a view taken along line 6—6 of FIG. 5;

FIG. 7 is a perspective view of the tool member of FIG. 5;

FIG. 8 is a side elevation of one portion of my invention and utilizing a novel tool member;

FIG. 9 is a sectional plan view taken along line 9—9 of FIG. 8;

FIG. 10 is a detail of the novel tool member shown in FIG. 8;

FIG. 11 is a schematic elevation showing the cutting action of tools arranged in accordance with the prior art;

FIG. 12 is a schematic elevation showing the cutting action of my novel tool arrangement;

FIG. 13 shows a first alternate embodiment of one portion of my invention; and

FIG. 14 is a second alternate embodiment of a portion of my invention.

This invention provides a novel arrangement of the tools or cutting member mounted on and protruding from an elongate, hollow, cylindrical tool holder used in a non-trenching cable laying device. The tool or earth agitator, which extends into the ground, rotates about its vertically inclined longitudinal axis while moving transversely in a direction normal thereto. A novel arrangement of the individual tool members minimizes buildup of any type of earth about and between the tools' cutting edges thereby greatly increasing the efficiency of the cable laying operation while eliminating the need for trenching and backfilling. Moreover, because of the aforementioned novel arrangement of the cutting tools which prevents earth buildup thereon during operation, I have found that I may increase the diameter of the tool holder cylinder or agitator so as to accommodate therethrough not only means for guiding the cable into its underground position, but also novel means to provide for annular disposition of grout material. Such disposition of grout may take the form of a partial lining beneath the conduit being laid (as is sometimes required in the case of leaching lines or the like) or for concentric and total circumferential encasement of material around the cable being laid.

The term agitator as used throughout this specification is intended to means not only means for mixing and displacing earth and the like, but also cutting, breaking, picking and chiseling to the extent that my tool holding member and tools secured thereto and protruding therefrom achieve such action as will be apparent thereinafter. The term cable is used to mean any flexible, elongate member, any sheath with or without separate inner strands, any hollow conduit, or the like.

My invention is best understood by referring first to FIG. 1 wherein a conventional four-wheeled vehicle is indicated generally at A and upon which a cable laying device embodying my novel apparatus is shown at B. Cable 11 to be laid may be mounted on conventional means generally indicated at C at the forward end of the vehicle or, alternatively, an entire length of cable 11a may be laid out over the route under which the cable is to be laid; in either case a free end of the cable is fed over sheave 13 and thence to the cable laying head indicated generally at 24. During operation, the earth agitator, which extends into the ground and is indicated generally at 46, rotates about its vertically inclined longitudinal axis agitating the earth surrounding it; as this occurs, the vehicle at A is propelled in the direction of arrow 18 and the agitator is displaced transversely in the same direction through the agitated or loosened earth. As the entire cable laying vehicle is propelled along the earth's surface, cable 11, or 11a, is fed through hollow tool holding portion 74 of the agitator and passes out through the bottom thereof for burial along underground region 17 wherein the cable becomes frictionally anchored by the surrounding earth in its permanent position of rest.

The cable laying head indicated at 24 is connected to base 19 which is shown attached rearwardly of the vehicle indicated at A. Arm actuator piston 21 is pivotally connected at one end to base 19 and at its other end to movable arm 22 to provide said arm with an overall swivel action through arc 23. The agitator head indicated at 24 is pivotally mounted at one end of arm 22 by means of bracket 26 having eccentric lobe 26a which in turn is connected to the piston end of agitator actuator 27; the cylinder end of actuator 27 is attached to bracket 28 on arm 22. Actuation of agitator head actuator 27 moves its piston in or out of the cylinder portion whereby pivotal motion is imparted to the agitator head as indicated by arc 29.

The means for actuating hydraulic cylinders 21 and 27 are of a conventional arrangement as indicated schematically in FIG. 4. Hydraulic pump 31 is driven by the engine and transmission indicated at 58 which normally propel the vehicle indicated at A. When pump 31 is connected to be driven by the engine through the transfer box indicated at 59 and comprising transfer case 66 and lever 66a, hydraulic fluid is pumped from reservoir 32 through filter 33 and thence through lines 34 and 36 to branches 37a and 37b which lead to inlet ports 38 and 39 of manual control valves 41 and 42, respectively, seen also on the console panel indicated in FIG. 1. By moving the manual control of either of valves 41 and 42 in the direction indicated between the letters L and R in FIG. 4, the pistons shown by the dotted lines within the cylinders of actuators 21 and 27 may be moved to any desired position corresponding to various positions of arm 22 and the cable layer indicated at 16 along the arcs 23 and 29, respectively. When the vehicle is proceeding from place to place but not in the process of laying cable underneath the earth's surface, arm actuator 21 may be positioned so that arm 22 is in its fully extended position. At the same time, the cable layer head may be rotated by means of actuator 27 so that the entire arrangement appears as shown by the interrupted lines shown in FIG. 1.

When the vehicle at A arrives at a place where the laying of cable or conduit is to commence, arm 22 is lowered placing the cable laying head indicated at 16 in position as shown by the solid lines of FIG. 1. As the piston of arm actuator 21 is actuated so as to place the arm in the aforementioned position, the flow of hydraulic fluid through the circuit proceeds, as shown in FIG. 4, through relief valve 43, heat exchanger 44, back to reservoir 32. At this point the earth agitator indicated at 46 is placed in its initial working position as shown n FIG. 1 either by first digging a hole into which the agitator may be placed, or by permitting the agitator to work itself into the ground through arc 29 to the desired angle of dependency α by rotating the agitator indicated at 46 in a manner to be described in greater detail below.

The cable layer head indicated generally at 24 is best seen in FIG. 2 and comprises generally two portions, the agitator, indicated generally at 46, and the driver or upper portion indicated at 47. Tool holding cylinder 53 is provided with course tapered threads 53a which provide a so called tool joint with cooperatively threaded portion 52c extending from and integral with bevel gear 52. Conventional V-belt pulleys indicated at 48 drive gear pinion 49 which is secured at one end of the shaft mounted on bearing 51. Pinion 49 engages bevel gear 52 which is integrally connected to tool holder cylinder 53, said gear being mounted between oppositely oriented thrust bearings 54 and 55. Tool holder cylinder 53 may be rotated by hydraulic motor 57 whose action is further described below.

When the vehicle shown in FIG. 1 is brought into position to commence cable laying, as described briefly above, the vehicle's internal combustion engine and differential drive indicated at 58 is disconnected by means of the transfer arrangement indicated generally at 59 comprising transmission 66 and manual lever 66a. Traction wheels 61 (and in the case of a four-wheel drive arrangement, wheels 62) are driven by means of a hydraulic creeper motor and drive indicated generally at 63. In this arrangement, variable displacement hydraulic pump 64 is connected through a forward-reverse and idle valve 66 to driving wheel motor 67. Agitator motor 57 is actuated by pump 68 through on-off valve 69 and is connected through servo valve 69 to control the vane setting of variable displacement pump 64. Under normal operating conditions, pump 64 causes hydraulic motor 67 to turn at a medium rate of speed which turns wheels 61 (and 62) so as to cause a nominal rate of forward velocity of the entire vehicle and cable layer in the direction of arrow 18, and normal rotational speed of tool holding member or agitator 53. If the cutting action of the earth agitator indicated generally at 46 encounters high resistance while laying cable, the hydraulic pressure in line 71 between motor 57 and servo valve 69 increases; and the variable displacement pump 64 is caused to reduce its output so that hydraulic motor 67 decreases in speed and the overall forward velocity of the vehicle and cable layer is reduced commensurate with the increased resistance at the earth agitator. At the same time, the back pressure from servo valve 69 causes a reduction in the speed of agitator motor 57 and hence agitator 53 so that tool bit pressure is also maintained at a relatively constant value preventing damage to the agitator and tool bits. Should the agitator encounter softer than normal earth and should the pressure in line 71 consequently drop, the adjustment of servo valve 69 on pump 64 causes variable displacement pump 64 to increase its output and increase the output speed of motors 57 and 67 and hence the speeds at which the tool members rotate and the vehicle and cable layer proceed in the direction of arrow 18.

When control 66 is placed in the neutral or idle position, the output of pump 64 is by-passed through line 72 back to reservoir 32. Under these conditions the hydraulic fluid has transmitted little if any work, its temperature remains relatively constant, and need not be cooled through heat exchanger 44.

Referring once again to FIG. 3, the inner sheath or channel 14 which guides the cable to be laid into the ground can be seen as it is normally disposed in bore 74 within tool holder or earth agitator 53. Protective channel 14, fabricated from a suitable flexible material, is held relatively stationary and protrudes outwardly and downwardly at an angle from the bottom of the tool holder through flared opening 76. In the embodiment of the device shown in FIG. 3, sheath 14 extends slightly rearwardly thus placing cable 11 in its permanent underground position.

To better understand how the actual earth agitation and displacement of my invention is accomplished in order to place the cable being laid underground, referce is next made to FIGS. 5 through 7 of the drawings. FIG. 5 shows a typical arrangement of my invention and is a more detailed view of tool holder cylinder 53 and its related parts. Secured into and along the surface of the tool holder are a series of straight tool members indicated at 77 and shown in greater detail in FIG. 7. For sake of clarity, only one tool member is shown but it is understood that a number of such members may be similarly secured in place so that corresponding elements of successive tool members describe a helical path such as helix 75. In FIG. 7, for purposes of reference, dashed line 78, coincident with one vertical edge of the tool indicated at 77, is parallel to the longitudinal axis 79 of tool holder 53; and line 79, which lies in the same plane as the lower surface of the tool indicated at 77, is parallel to plane 80 in which the lower end edge portion of tool holder cylinder 53 lies.

The direction of procession through the earth's crust of each tool member indicated by 77 is shown by arrow 81. The tool is shaped to have a lower leading edge 82 and an inclined receding face 83 which causes the tool to have what is characterized by those skilled in the art as a positive axial rake angle 86. With such a rake angle, the pressure of the ground being cut by the tool member tends to keep the earth agitator cylinder from rising out of its operating position. The rear portion of the tool is relieved to form a trailing face 84 which also tends to give sharpness to leading edge 82. As seen in the sectional view of FIG. 6, typical tool 77 is mounted in cylinder 53 by simply inserting shank portion 87 into opening 88 which is the wider stepped portion of a slot having heel portion 89. I have found that it is simple and satisfactory to form these stepped holding slots for the tool I have described by simply cutting out the sectoral portion indicated at 91 from the heavy-walled tube stock and welding shaped portion 91a into place in said cut out sectoral portion as indicated in the sectional view of FIG. 6. By orienting my tool holding in the manner described, i.e., so that the longitudinal axis 92 of the tool lies along a chord of cylinder 53 and with the cutting edge 82 canted in the direction of rotation indicated by arrow 81, cutting edge 82 is oriented at a positive radial rake angle 93. With such a radial rake angle, the cutting tool is generally in a position to cause maximum and efficient cutting of the earth as tool holder 53 is positioned into the earth and rotated by the mechanical hydraulic arrangement described above. This action may also be described as picking or chiseling in the case of especially hard ground, rock, or the like. As such rotation and earth agitation occurs, the entire cable laying device proceeds forwardly in the direction of arrow 18 (FIG. 1) and cable, conduit or the like is conveyed down through the central hollow region of tool holding member 53 for laying therebeneath in the earth's crust in its permanent position.

In order to achieve relatively efficient and effective displacement and agitation of the earth so that cable may be layed using non-trenching techniques, I have carried out extensive experiments to determine the optimum arrangement of the tool cutting members or teeth, indicated generally at 77 in FIG. 5, in respect to each other. Initially, the tool bits or teeth were arranged in an orientation exemplified by various prior art devices as shown in FIG. 11. In this type of arrangement, successive tool faces 94b, 96b, etc., which terminate, respectively, at cutting edges 94a, 96a, etc., are each positioned to have a positive axial rake angle. The position of the tool bits around the tool holding cylinder is such that with the cylinder moving through the earth's crust in direction 18 transverse to the cylinder's longitudinal axis, and with the cylinder rotating in direction 81 about its longitudinal axis, the cutting edge of one advancing tool, such as edge 94a, advances through a region of the earth's crust below that about to be occupied by cutting edge 96a of the next successive tool which is nearest to tool bit 94 and rearward of it in respect to the tool holding cylinder's direction of advancement. In the prior art devices that I have seen, the path described by corresponding portions of successive tool members is in the form of a helix, such as that indicated by line 97, whose direction of descent, indicated by arrow 99, around the tool holding cylinder in its earth agitating position is in the same direction as the direction of rotation of the cylinder about its longitudinal axis. The above described arrangements of tool members on an earth agitator causes an earth cutting and displacing action which deflects the earth upwardly in the direction of arrows 98 to form a compressed earth region, as indicated at D, directly in the path of the next advancing tool, such as member 96 shown in dashed lines in its advancing position. Such compaction of earth has been observed to form around each tool cutter of the agitator thereby obstructing the cutting edges and hindering further earth agitation. With the cutting edges of the tool members thus disabled, the entire earth agitator tends to become encased and form a relatively solid and smooth cylinder of compressed earth material. The agitator is then not only relatively inoperative in respect to earth agitation, but even if rotation about its longitudinal axis is continued, the smooth cylindrical profile of the agitator affords a blunt and highly resistive obstruction to transverse movement normal to its longitudinal axis. Consequently, further progress of the carrier vehicle along the earth's surface means of its tractive wheel drive is resisted; and the entire cable laying operation is caused to slow down appreciably if not cease entirely. The above described phenomena may be even more accentuated if the earth in which the cable laying is being attempted is of a damp or clay like composition which tends to adhere readily to the tool members and form cohesive clusters with itself. If rocks or other obstructions, such as roots and the like, are also present, there is a tendency for such obstructions to become lodged between the tool members and holding cylinder thus adding frictional drag between the earth agitator mechanism and the surrounding earth.

After much experimenting I finally tried the novel arrangement of tool members indicated in FIGS. 2, 5 and 8 and best shown, for purposes of understanding its novel features and advantages over the prior art, in FIG. 12. This arrangement gives surprising results in a variety of earth conditions and provides a highly effective and efficient means for non-trenching cable laying. In this novel arrangement, successive tool faces 103b, 104b, etc., which terminate, respectively, at cutting edges 103a, 104a, etc., are each positioned to have a positive axial rake angle similar to that of the typical prior art tool bits shown in FIG. 11. However, the position of the tool members in FIG. 12 around the tool holding cylinder moving transversely through the earth's crust in direction 18 normal to the cylinder's longitudinal axis, and with the cylinder rotating in direction 81 about its longitudinal axis, the cutting edge of one tool, such as edge 103a, advances through a region of the earth's crust above that about to be occupied by cutting edge 104a of the next successive tool which is nearest to tool 103 and rearward of it in respect to the tool holding cylinder's direction of advancement. In one embodiment of my invention, as shown for example, in FIGS. 5–8, corresponding portions of successive tool members may describe the path of a helix such as that indicated by line 102. In contrast to helix line 97 in FIG. 11, the direction of descent 108 in FIG. 12 of helix line 102 around the tool holding member is counter to the direction of rotation 18 of the cylinder about its longitudinal axis. It is only this particular configuration of helix, if a helical arrangement of the tool members is used, which is also characterized by the above description of my novel tool member arrangement.

The foregoing described arrangement of tool members on an earth agitator causes an earth cutting and displacing action which deflects the earth upwardly in the direction of arrows 106; however, unlike the compression effect caused by the arrangement of the prior art devices as explained in respect to FIG. 11, the material indicated at E deflected by one tool, such as member 104, is displaced upwardly into a region indicated at F through which tool member 103 has passed in going from the position indicated by the dashed line in FIG. 12 to its solid line representation to the left of the figure. Hence the material being deflected upwardly by tool 104 has a region of relatively negative soil pressure, or relief, rather than resistive compression, wherein to pass and remain in a loosened state; and the cutting edges of the several tool members are not subjected to the obstructive action of compacted material as in the case with devices exemplified by the description of FIG. 11. The earth agitator is thus able to cut continuously through the surrounding ground, which becomes and remains relatively loosened, displacing the material around the tool holding cylinder; and the entire cable laying vehicle may continue to progress in the direction of travel indicated by arrow 18 thereby causing the cable to be placed underground in the desired manner of operation.

In FIGS. 8 through 10 I show an alternate embodiment of the earth agitator of my invention utilizing a novel tool member. The difference between this tool member, indicated generally at 177 in FIG. 8, and that shown in FIG. 5 is best seen by referring to FIGS. 9 and 10 wherein numerals of reference referring to corresponding parts designated in FIG. 5 are distinguished only in that the numerals of reference in the alternate embodiment are of the 100 series; for example, the cutting edge of the tool seen in FIG. 5 is designated by the numeral 82 while the corresponding cutting edge of the tool in FIG. 10 is designated 182. By a comparison of FIGS. 5 and 10, it can be seen that the major difference between the two types of tool members is that the longitudinal axis 192 of the tool member shown in FIGS 8 through 10 is not an alignment with the longitudinal axis 192a of shank portion 187 but rather intersects the latter to define oblique sweep angle $\beta$. As seen in the sectional view of FIG. 9, shank 187 of of the tool member is inserted into a stepped slot portion similar in all respects to that shown in the embodiment of FIGS. 5 through 7. As a result of sweep angle $\beta$, the cutting edge and inclined face portion of the tool member indicated at 177 does not extend in such a way as to describe a positive radial rake angle as is the case with the tool member indicated at 77 in FIGS. 5 through 7; but rather describes negative rake angle 193 which is characterized by the cutting edge of the tool being inclined away from the direction of rotation as indicated by arrow 181. By having this novel arrangement of the cutting edge of the tool in respect to the tool shank itself, so that the space enclosed between the cutting edge and the earth agitator surface describes an obtuse angle, the tendency to ensnare rocks, root structures, or the like, between the cutting edge of the tool and the agitator cylinder, is virtualy eliminated. Although the straight tool embodiment with a positive radial rake angle as shown in FIGS. 5 through 7 is a more efficient tool for most types of soil, the alternate embodiment described above is far more effective in gravel and root infested areas because of its ability to avoid ensnarement with such obstacles and attendant increase in frictional drag, loss of cutting efficiency, and the like. I have found that in certain locations root structures and the like may be encountered fairly consistently at one elevation and position of the earth agitator, while at other strata the earth is of a fairly consistent and different nature free of such obstructions and the like. Under these circumstances I have employed another novel embodiment of my invention. Because of the relatively simple arrangement for securing the tool elements to the earth agitator cylinder of this invention, and the relative ease with which the tool holding member may be disconnected, if necessary, by means of the tool joint described earlier, I have found it convenient and expedient to place tool members having a negative rake angle along one portion of my earth agitator while employing those of a positive rake angle along the remainder. By so doing, earth agitation at the different strata, which encounters different types of obstructions, is greatly facilitated and increases the overall efficiency and effectiveness of my novel cable laying apparatus. It is obvious that such a novel embodiment need not be limited in any particular manner to the arrangement of the types of tool elements that I have described nor need such arrangement necessarily be limited to the particular types of tool elements described above; rather, a wide variety of too types and arrangements may be utilized which are provided with my novel structure for making such tools easily installed in a manner which avoids clogging of successive cutting surfaces and edges.

Although I have described my invention in respect to FIGS. 5 through 7, 6 through 9, and at FIG. 12 as employing a particular configuration helix, it is understood that the helix arrangement has been designated partly for the sake of convenience in the shop fabrication of my device. The essential feature in this one respect of my novel arrangement is that the tool elements are arranged so that the cutting or agitating path of one tool creates relief for a succeeding tool, and the material being displaced by the leading and inclined face of a tool member is provided working clearance for its agitation. By such a novel arrangement, relatively little material is piled onto the face and cutting edge of an advancing tool; in this way obstruction of the cutting edges, which appears generally to reduce if not eliminate the effectiveness of the various prior art devices with which I am familiar, is minimized if not altogether eliminated. Such a pattern need not necessarily be a helix but may involve any distribution which establishes the aforementioned cutting edge and surface relief.

I have also found that under certain circumstances it is beneficial to employ double helical patterns of tool elements which, however, otherwise follow the same novel arrangement that I have described above. Such an arrangement also may, under certain circumstances, follow other than a helical path if the form of cutting relief described above is provided.

Referring again to FIGS. 2 and 3, there is shown thereon guide shoe 301 which may be appended to the cable laying head indicated generally at 16 when its use is indicated as explained herebelow. The guide shoe is secured to flange plate 302 by means of stud extensions 303 which at one end are welded or otherwise suitably secured to the upper portion of shoe 301 and at the other end fastened by means of bolts or the like (not shown) to securing eyes 304. The purpose of shoe 301 is to provide a stabilizing rudder effect to the entire cable laying device and vehicle when proceeding through particularly soft or marsh-like earth. This may be necessary because under such operating conditions the rotational reaction forces of the tool holding member and the tool cutters tends to shift the rear of the cable laying vehicle away from its desired direction of advancement and path of cable laying. Guide shoe 301 acts as a rudder or keel to minimize if not entirely prevent such shift and annoyance of operation which may also be minimized by constant compensation of the steering mechanism of the vehicle indicated at A in FIG. 1.

In FIG. 13 I show a variation of my invention which is of particular utility in the laying of leaching lines and the like where it is desirable to deposit a layer of grout or other suitable material 114 beneath the cable 111 being laid. As I have noted earlier, the use of my novel tool elements and their configuration on the earth agitator not only achieves greater non-trenching cable laying efficiency, but also permits the use of somewhat larger diameter earth agitators than those generally shown in the prior art.

onsequently, I am able to accommodate therethrough not only flexible sheath 114, through which the cable being laid is passed, but also an amount of grout which is stored in hopper 117 and conveyed therethrough into cylindrical bore or passage 174 in the direction of arrows 118. The grout then passes by gravity under the exiting portion of sheath 114 and is permanently disposed in the region under cable 111 being laid. For purposes of clarity, I have omitted many of the details of the cable laying device itself including the various tool elements which are secured to cylinder 153 but which are similar to those that have been described in greater detail hereinabove.

FIG. 14 shows another variation of my invention which may be employed when laying conduit or cable 211 or the like and wherein it is desirable to have grout or other suitable encasement 216 surrounding the entire cable once in its underground position. This embodiment also utilizes an enlarged cylinder such as tool holder 253. In this type of an arrangement, however, cable 211 to be laid is passed into hopper 217 which itself is secured by means of a clamp 215 or other suitable device to the upper inside portion of sheath 214. As the cable advances in the direction of arrow 218a, the grout or other suitable material flows by gravity in the direction of arrow 218b into the annular space between the cable being laid and the inner wall of sheath 214 and thence downwardly along with the cable into the underground position where both the grout and the cable are permanently placed. In this arrangement, sheath 214 is designed to extend a distance indicated by dimension 219 in order to form sufficient protection against the intrusion of surrounding earth and the like to the cable and surrounding grout being laid. As the cable laying apparatus advances, however, the combination of cable and circumferentially encasing grout is caused to be permanently placed in position as shown at region 221. Again, for purposes of clarity, many details of the cable laying device itself are omitted from FIG. 14; but such details are readily understood as being similar to those that have been described hereinabove.

Although the foregoing invention has been described in some detail by way of illustration and example for purposes of clarity of understanding, it is understood that certain changes and modifications may be practiced within the spirit of the invention and scope of the appended claims.

I claim:

1. In a cable laying device for non-trenching placement of cable beneath the earth's surface of the type having an elongate tubular tool holding member adapted to be moved transversely through the earth and with its longitudinal axis substantially vertical, means in the center of said tool holding member to carry a cable to the bottom portion thereof, and means for rotating said tool holding member in a predetermined direction while simultaneously moving the tool holding member transversely through the earth's surface, the improvement comprising: a plurality of teeth mounted on and projecting from the surface of said tool holding member, each of said teeth forming an upper and lower surface disposed at an angle to force earth in a first direction during rotation, each tooth being mounted with respect to the closest next succeeding tooth with reference to the direction of rotation of the tool holding member and at a position opposite from the direction of displacement of earth affected by the preceding tooth.

2. In a cable laying device for non-trenching placement of cable beneath the earth's surface of the type having an elongate tubular tool holding member adapted to be moved transversely through the earth and with its longitudinal axis substantially vertical, means in the center of said tool holding member to carry a cable to the bottom portion thereof, and means for rotating said tool holding member in a predetermined direction while simultaneously moving the tool holding member transversely through the earth's surface, the improvement comprising: a plurality of teeth mounted on and projecting from the surface of said tool holding member with successive teeth arranged in a helical path around said tool holding member, each of said teeth forming an upper and lower surface disposed at an angle to force earth in a first direction during rotation, each tooth being mounted with respect to the closest next succeeding tooth in the helix at a position opposite from the direction of displacement of earth affected by the preceding tooth.

3. In a cable laying device for non-trenching placement of cable beneath the earth's surface of the type having an elongate tubular tool holding member adapted to be moved transversely through the earth and with its longitudinal axis substantially vertical, means in the center of said tool holding member to carry a cable to the bottom portion thereof, and means for rotating said tool holding member in a predetermined direction while simultaneously moving the tool holding member transversely through the earth's surface, the improvement comprising: a plurality of teeth mounted on and projecting from the surface of said tool holding member, each of said teeth forming an upper and lower surface disposed at an angle to force earth upwardly during rotation, each tooth being mounted with respect to the closest next succeeding tooth with reference to the direction of rotation of the tool holding member and below the preceding tooth.

4. In a cable laying device for non-trenching placement of cable beneath the earth's surface of the type having an elongate tubular tool holding member adapted to be moved transversely through the earth and with its longitudinal axis substantially vertical, means in the center of said tool holding member to carry a cable to the bottom portion thereof, and means for rotating said tool holding member in a predetermined direction while simultaneously moving the tool holding member transversely through the earth's surface, the improvement comprising: a plurality of tool bits each secured to and projecting from said tool holding member, each tool bit having a leading cutting edge and forming an upper and lower surface defining a positive axial rake angle, said tool bits arranged to describe a helical path around said tool holding member having a direction of helical descent opposite to the direction of rotation of the tool holding member.

5. In a cable laying device for non-trenching placement of cable beneath the earth's surface of the type having an elongate tubular tool holding member adapted to be moved transversely through the earth and with its longitudinal axis substantially vertical, means in the center of said tool holding member to carry a cable to the bottom portion thereof, and means for rotating said tool holding member in a predetermined direction while simultaneously moving the tool holding member transversely through the earth's surface, the improvement comprising: a plurality of tool bits each secured to and projecting from said tool holding member, each tool bit having a leading surface terminating in a cutting edge thereof with said surface defining a positive axial rake angle and each said cutting edge defining a region during the simultaneous rotation and transverse movement of said tool holding member, the region defined by one said cutting edge being at a generally higher elevation than the region defined by the cutting edge of the next succeeding tool bit in reference to said rotation.

6. In a cable laying device for non-trenching placement of cable beneath the earth's surface of the type having an elongate tubular tool holding member adapted to be moved transversely through the earth and with its longitudinal axis substantially vertical, means in the center of said tool holding member to carry a cable to the bottom portion thereof, and means for rotating said tool holding member in a predetermined direction while simultaneously moving the tool holding member transversely through the earth's surface, the improvement comprising:

a plurality of tool bits mounted on and projecting from the surface of said tool holding member at a positive radial rake angle, each tool bit having a leading surface terminating in a cutting edge thereof with said surface defining a positive axial rake angle, each tool bit being mounted at an elevation higher than the closest next succeeding tool bit with reference to the direction of rotation of said tool holding member.

7. In a cable laying device for non-trenching placement of cable beneath the earth's surface of the type having an elongate tubular tool holding member adapted to be moved transversely through the earth and with its longitudinal axis substantially vertical, means in the center of said tool holding member to carry a cable to the bottom portion thereof, and means for rotating said tool holding member in a predetermined direction while simultaneously moving the tool holding member transversely through the earth's surface, the improvement comprising: a plurality of tool bits mounted on and projecting from the surface of said tool holding member at a negative radial rake angle, each tool bit having a leading surface terminating in a cutting edge thereof with said surface defining a positive axial rake angle, each tool bit being mounted at an elevation higher than the closest next succeeding tool bit with reference to the direction of rotation of said tool holding member.

8. In a cable laying device for non-trenching placement of cable beneath the earth's surface of the type having an elongate tubular tool holding member adapted to be moved transversely through the earth and with its longitudinal axis substantially vertical, means in the center of said tool holding member to carry a cable to the bottom portion thereof, and means for rotating said tool holding member in a predetermined direction while simultaneously moving the tool holding member transversely through the earth's surface, the improvement comprising: a plurality of tool bits mounted on and projecting from the surface of said tool holding member, some of said tool bits projecting at a positive radial rake angle and the remainder at a negative radial rake angle, each tool bit having a leading surface terminating in a cutting edge thereof with said surface defining a positive axial rake angle and being mounted at an elevation higher than the closest next succeeding tool bit with reference to the direction of rotation of said tool holding member.

9. In a non-trenching cable laying device the combination comprising: an elongate, rotatable, tubular tool holding member adapted to be moved transversely through the earth and with its longitudinal axis substantially vertical; a cable carrying bore formed in the center of said tool holding member and opening at the bottom thereof; means for rotating said tool holding member in a predetermined direction while simultaneously moving the tool holding member transversely through the earth's surface; a plurality of tool bits mounted on and projecting from said tubular tool holding member, each of said tool bits forming a surface terminating in a cutting edge, said surface defining a positive axial rake angle, and each tool bit being mounted above the next closest succeeding tool bit with reference to the direction of rotation and transverse movement of the tool holding member; a hopper mounted on top of said tool holding member and adapted to hold a quantity of grout material; and means in fluid communication with said hopper and said tool holding member to convey grout into said tubular member and to the bottom portion thereof.

10. In a non-trenching cable laying device the combination comprising: an elongate, rotatable, tubular tool holding member adapted to be moved transversely through the earth and with its longitudinal axis substantially vertical; a bore formed in the center of said tool holding member and opening at the bottom thereof; a cable and grout carrying guide mounted in said bore; means for rotating said tool holding member in a predetermined direction while simultaneously moving the tool holding member transversely through the earth's surface; a plurality of tool bits mounted on and projecting from said tubular tool holding member, each of said tool bits forming a surface terminating in a cutting edge said surface defining a positive axial rake angle, and each tool bit being mounted above the next closest succeeding tool bit with reference to the direction of rotation and transverse movement of the tool holding member; a hopper mounted on top of said tool holding member and adapted to hold a quantity of grout material; and means in fluid communication with said hopper and said cable and grout carrying guide to convey grout into said tubular member to the bottom portion thereof.

11. In a vehicle driven, cable laying device for the non-trenching placement of cable beneath the earth's surface, the combination comprising: an elongate, tubular, tool holding member rotatably secured at one end to said vehicle and vertically depending therefrom into the earth for transverse movement through the earth's surface in conjunction with forward movement of said vehicle, said member formed with a channel to carry a cable from the vehicle to the earth adjacent the bottom portion of the member to lay the cable in conjunction with forward movement of the vehicle; means for rotating said tool holding member in a predetermined direction while simultaneously moving the tool holding member transversely through the earth's surface; a plurality of tool bits mounted on and projecting from said tool holding member, each said tool bit forming a positive axial rake angle surface terminating in a cutting edge, said tool bits being mounted in a pattern on said member in which each bit is mounted at a higher elevation than the next closest succeeding bit with reference to the direction of rotation of said member; and a flat plate attached to the rear end of said vehicle and vertically depending therefrom into the earth with the lower edge thereof being positioned above the bottom of said tool holding member and parallel to the direction of motion of said vehicle.

12. A vehicle driven, cable laying device for non-trenching placement of cable beneath the earth's surface, comprising: an elongate tubular tool holding member rotatably secured at one end to said vehicle and vertically depending therefrom into the earth for transverse movement through the earth's surface in conjunction with forward movement of said vehicle, said member formed with a channel to carry a cable from the vehicle to the earth adjacent the bottom portion of the member to lay the cable in conjunction with forward movement of the vehicle, power means mounted on said vehicle to rotate said member in a predetermined direction during forward movement of said vehicle, a plurality of tool bits mounted on and projecting outwardly from said member, each of said bits formed to define a cutting edge facing in the direction of rotation of said member and positive axial rake angle surfaces, said bits being mounted in a relative pattern on said member in which each bit is mounted at a higher elevation than the next closest succeeding bit with reference to the direction of rotation of said member, means to sense the degree of drag against rotation of said member and means connected to control the rate of forward movement of said vehicle controlled by said sensing means to vary the rate of forward vehicle movement inversely of the drag against said member to maintain the working pressure against the bits constant.

13. In a cable laying device for non-trenching placement of cable beneath the surface of the earth of the type having a cable carrying cylinder adapted to be moved transversely through the earth with the longitudinal axis of the cylinder substantially vertical, and means for rotating said cylinder in a predetermined direction while simultaneously moving the cylinder transversely through the surface of the earth, the improvement comprising: a plurality of tool members each having a cutting edge portion and a shank portion; the wall of said cylinder formed to ovide an array of elongate cavities shaped complementry to the shank portion of said tool member and into 1ich said tool members are frictionally nested, each of id cavities having a longitudinal axis positioned in coial alignment to a chord of the cylinder in a plane noral to the longitudinal axis thereof to define at the surce of said cylinder an opening facing in the direction rotation of the cylinder; and means on each said tool ember engageable with the cavity wall to interlock said ol member therein.

References Cited
UNITED STATES PATENTS

| | | | |
|---|---|---|---|
| 481,656 | 8/1892 | Renold et al. | 299—91 X |
| 1,006,116 | 10/1911 | Morse | 61—72.2 |
| 1,377,602 | 5/1921 | Rutherfurd | 172—3 |
| 1,691,351 | 11/1928 | Hicks | 172—111 |

FOREIGN PATENTS

| | | |
|---|---|---|
| 689,754 | 4/1953 | Great Britain. |
| 324,052 | 10/1957 | Switzerland. |

ERNEST R. PURSER, *Primary Examiner.*